US006663843B2

(12) United States Patent
Ono et al.

(10) Patent No.: US 6,663,843 B2
(45) Date of Patent: Dec. 16, 2003

(54) METHOD OF PRODUCING BARIUM-CONTAINING COMPOSITE METAL OXIDE

(75) Inventors: Keiji Ono, Tsukuba (JP); Susumu Miyazaki, Kitasoma-gun (JP)

(73) Assignee: Sumitomo Chemical Company, Limited, Osaka (JP)

( * ) Notice: Subject to any disclaimer, the term of this patent is extended or adjusted under 35 U.S.C. 154(b) by 93 days.

(21) Appl. No.: 09/912,521

(22) Filed: Jul. 26, 2001

(65) Prior Publication Data

US 2002/0025901 A1 Feb. 28, 2002

(30) Foreign Application Priority Data

Jul. 28, 2000 (JP) ........................................ 2000-228532

(51) Int. Cl.$^7$ ............................ C01B 13/32; C01B 7/01
(52) U.S. Cl. .............................. 423/594.16; 423/593.1; 423/594.14; 423/598; 423/599; 423/600; 501/123; 501/125; 501/135; 501/137; 501/152
(58) Field of Search ................................. 423/593, 594, 423/263, 600, 599, 598, 594.14, 594.16, 593.1, 635, 636; 501/123, 125, 152, 135, 137

(56) References Cited

U.S. PATENT DOCUMENTS 4,643,984 A * 2/1987 Abe et al. .............. 208/120.25
5,736,111 A * 4/1998 Saegusa ..................... 423/594
5,840,267 A   11/1998 Saegusa
5,846,505 A * 12/1998 Saegusa ..................... 505/441
2002/0064499 A1 * 5/2002 Uchida ....................... 423/598

FOREIGN PATENT DOCUMENTS

| EP | 0 666 238 A | | 8/1995 | |
| EP | 1176119 A1 | * | 1/2002 | ........... C01B/13/18 |
| JP | 59174531 A | * | 10/1984 | ........... C01G/49/00 |
| JP | 07187612 A | * | 7/1995 | ........... C01B/13/14 |

OTHER PUBLICATIONS

Derwent Publication XP002181048, May 24, 1984, for JP 59090303.*

* cited by examiner

*Primary Examiner*—Steven Bos
*Assistant Examiner*—Anthony Kuhar
(74) *Attorney, Agent, or Firm*—Sughrue Mion, PLLC

(57) ABSTRACT

A method for producing a barium-containing composite metal oxide, comprising calcining a mixture of a barium compound and a metal compound comprising at least one metal selected from the group consisting of magnesium, aluminum, europium, manganese, strontium, calcium, terbium, zinc and titanium, or calcining a barium-containing composite metal salt comprising barium and at least one metal selected from the group consisting of magnesium, aluminum, europium, manganese, strontium, calcium, terbium, zinc and titanium, in a gas comprising a hydrogen halide and water vapor.

8 Claims, No Drawings

METHOD OF PRODUCING BARIUM-CONTAINING COMPOSITE METAL OXIDE

FIELD OF THE INVENTION

The present invention relates to a method for producing a barium-containing composite metal oxide which can be used as a raw material for a powder, paste or a sintered body of functional oxide ceramics used in fluorescent substances, dielectrics or the like.

BACKGROUND OF THE INVENTION

Barium-containing composite metal oxides are widely used as functional materials such as fluorescent substances, dielectrics or the like.

Example of the barium-containing composite metal oxide used as fluorescent substances includes, for example, europium-activated barium magnesium aluminate. The europium-activated barium magnesium aluminate is a compound represented by the composition formula $BaMgAl_{10}O_{17}$:Eu, is a fluorescent substance emitting blue color by excitation of vacuum ultraviolet rays or the like, and is therefore used as PDP, rare gas lamps or the like. Further, a compound in which a part of barium in the europium-activated barium magnesium aluminate is substituted with strontium or calcium is known as a blue color emitting fluorescent substance.

Example of a barium-containing composite metal oxide used as a fluorescent substance include, for example, manganese-activated barium aluminate. The manganese-activated barium aluminate is a compound represented by the composition formula $BaAl_{12}O_{19}$:Mn, and shows emission of green color by excitation of vacuum ultraviolet rays or the like. Further, a compound in which a part of barium in the manganese-activated barium aluminate is substituted with europium is known as a green color emitting fluorescent substance.

Example of the barium-containing composite metal oxide used as a dielectric includes barium titanate. The barium titanate is a compound represented by the composition formula $BaTiO_3$, and shows high dielectric constant. As a result, the barium titanate is widely used for a lamination type capacitor. Further, a compound in which a part of barium in the barium titanate is substituted with strontium also shows high dielectric constant.

Those barium-containing composite metal oxides have conventionally been obtained by a liquid phase method, a gas phase method, a solid phase method, a hydrothermal synthesis method, a flux method or the like. The oxides thus obtained are generally in the form of a powder containing many agglomerated particles.

Japanese Patent Application Laid-open No. Hei 7-187612 discloses a method for producing a composite metal oxide powder by calcining a composite metal oxide precursor powder in a halogen-based gas as a method for producing a composite metal oxide powder having less agglomerated particles and showing narrow particle size distribution. However, this publication does not contain the disclosure regarding barium-containing composite metal oxides.

The barium-containing composite metal oxides are, in many cases, once dispersed in a dispersion medium in the form of paste, a slurry or the like, and then, converted into a final product. For this reason, dispersibility of the oxides to a dispersion medium directly reflects functions and physical properties of the final product. Therefore, the dispersibility of metal oxides is one of the important properties. Further, while dielectrics are usually used in the form of a sintered body, in some cases, its dispersibility gives great influence on the property of sintered body. Therefore, there is a desire for improvement in dispersibility of barium-containing composite metal. In general, dispersibility is improved by decreasing agglomeration proportion of primary particles with each other, and in view of this, there is also a desire for development of barium-containing composite metal oxides having weak agglomerating force of primary particles with each other.

SUMMARY OF THE INVENTION

Accordingly, an object of the present invention is to provide a method for producing a barium-containing composite metal oxide having weak agglomerating force of primary particles with each other, suitably used for functional oxide ceramic powder such as fluorescent substances or dielectrics, raw materials for pastes, or raw materials for sintered bodies.

As a result of extensive investigations to achieve the above object, it has been found that a barium-containing composite metal oxide having weak agglomerating force of primary particles with each other is obtained by calcining raw material compounds thereof in a specific gas atmosphere.

According to the present invention, there is provided a method for producing a barium-containing composite metal oxide, which comprises calcining a mixture of a barium compound and a metal compound comprising at least one metal selected from the group consisting of magnesium, aluminum, europium, manganese, strontium, calcium, terbium, zinc and titanium, or calcining a barium-containing composite metal salt comprising barium and at least one metal selected from the group consisting of magnesium, aluminum, europium, manganese, strontium, calcium, terbium, zinc and titanium, in a gas comprising a hydrogen halide and water vapor.

DETAILED DESCRIPTION OF THE INVENTION

The present invention is described in detail below.

The barium compound used in the present invention may be barium oxides, or any barium compound as long as it converts to a barium oxide by decomposition reaction or oxidation reaction when it is calcined.

Similar to the above-described barium compound, the metal compound comprising at least one metal selected from the group consisting of magnesium, aluminum, europium, manganese, strontium, calcium, terbium, zinc and titanium used in the present invention (hereinafter sometimes referred to as a "metal compound") may be oxides comprising at least one metal selected from the group consisting of magnesium, aluminum, europium, manganese, strontium, calcium, terbium, zinc and titanium, or any compound as long as it converts to a metal oxide by decomposition reaction or oxidation reaction when it is calcined.

The composite metal salt used in the present invention may be any metal salt as long as it comprises at least one metal selected from the group consisting of magnesium, aluminum, europium, manganese, strontium, calcium, terbium, zinc and titanium, and barium, and converts to a barium-containing composite metal oxide described hereinafter by decomposition reaction or oxidation reaction when it is calcined.

Calcination conditions may be exemplified as described hereinafter. Examples of the compound that converts to its oxide by decomposition reaction or oxidation reaction include hydroxides, aqueous oxides, oxyhydroxides, oxyhalides, halides, carbonates, oxalates, sulfates and nitrates.

The above-described barium compound, metal compound and composite metal salt can be produced by conventional methods. For example, the methods include the liquid phase method, the gas phase method, the solid phase method or the like.

The above-mentioned barium compound is mixed with above-mentioned metal compound to obtain the mixture of barium compound and metal compound in a ratio so that a specific composition ratio of a complex metal oxide including barium described later is obtained.

Methods of mixing a barium compound and a metal compound are illustrated as any suitable method now known or developed in the future, and for example, mixing methods using a ball mill, V-shape mixer, and stirring apparatus and the like, may be exemplified.

The order of feeding a barium compound and a metal compound to a mixing apparatus is not particularly restricted, and both of them may be fed simultaneously fed separately, or they may be fed according to a master batch mode.

In a mixture of the barium compound and the metal compound, a barium oxide and a barium compound which converts to a barium oxide by decomposition reaction or oxidation reaction when it is calcined may be used together as the barium compound. Further, a metal oxide and a metal compound which converts to a metal oxide by decomposition reaction or oxidation reaction when it is calcined may be used together as the metal compound, or at least two kinds of the metal compounds or at least two different kinds of metals may be used together as the metal compound. A metal compound containing at least two kinds of metals may also be used.

A mixture of the above-described barium compound and metal compound comprising at least one metal selected from the group consisting of magnesium, aluminum, europium, manganese, strontium, calcium, terbium, zinc and titanium, or a composite metal salt comprising at least one metal selected from the group consisting of magnesium, aluminum, europium, manganese, strontium, calcium, terbium, zinc and titanium, and barium (both the mixture and the composite metal salt are hereinafter sometimes referred to as a "raw material compound") is calcined in a gas comprising hydrogen halide and water vapor.

Concentration of the hydrogen halide used is preferably about 1 vol % or more, more preferably about 5 vol % or more to the total volume of the gas from the standpoint that agglomeration proportion in primary particles with each other of the barium-containing composite metal oxide obtained is further suppressed. Further, concentration of the hydrogen halide is preferably about 50 vol % or less from the standpoint of suppressing formation of halides.

Examples of the hydrogen halide include hydrogen chloride, hydrogen bromide and hydrogen fluoride. Hydrogen chloride is preferably used as the hydrogen halide from the standpoint that it is easily available as a raw material. Two kinds of hydrogen halide may be used together.

In the case where water vapor is not present in the gas, barium easily reacts with hydrogen halide during calcination, and volatilizes off as a barium halide gas. As a result, the objective barium-containing composite metal oxide may not be sufficiently obtained. Concentration of water vapor in the gas is preferably about 0.5 vol % or more, more preferably bout 2 vol % or more to the total volume of the gas from the standpoint of suppressing formation of barium halide.

The gas may contain an inert gas such as nitrogen or argon, oxygen or air as a dilution gas. Further, if it is necessary to reduce a metallic element, a gas having a reducing property, such as a hydrogen gas, may further be present in the gas.

A supply source and a supply method of each component in the gas can be any source and method generally used industrially. A hydrogen halide gas may be supplied, for example, from cylinder, tank or reservoir of hydrogen halide gas. A gas containing hydrogen halide may also be prepared and used utilizing evaporation or decomposition of a halide compound such as ammonium halide, a halogen-containing polymeric compound such as vinyl chloride polymer, or the like. A mixture of the above-described raw material compound and a halide compound, a halogen-containing polymeric compound or the like may be calcined in a calcining furnace.

Method for supplying water vapor may be a method of supplying steam, a method of supplying a gas other than a water vapor through water, a method of arranging water in a calcining furnace prior to calcination and supplying water vapor by evaporating water when calcining, and a method of using raw material compounds containing water.

In the production method of the present invention, calcination temperature is generally from about 500 to about 1,7000° C. preferably from about 800 to about 1,500° C., more preferably from about 1,100 to about 1,500° C., although varying depending on the kind of the objective barium-containing composite metal oxide, concentration of components contained in a gas, or the like. For example, in the case of producing a compound represented by the composition formula $(Ba, Eu, M^A)MgAl_{10}O_{17}$ (wherein $M^A$ represents at least one element selected from the group consisting of calcium, strontium, zinc and europium), the calcination temperature is preferably in a range of from about 1,100 to about 1,400° C.

Calcination time is preferably from about 1 minute to about 24 hours, more preferably from about 10 minutes to about 10 hours, although varying depending on the kind of the objective barium-containing composite metal oxide, concentration of components contained in a gas, calcination temperature, or the like. The calcination time can be shortened by high calcination temperature.

Calcining furnaces generally used industrially may be used as a calcination apparatus. The calcining furnace is preferably constituted of a material resistant to corrosion by hydrogen halide, and is preferably equipped with a mechanism that can regulate an atmosphere in the apparatus. Further, because an acid gas such as a hydrogen halide gas is used, the calcining furnace preferably has an airtightness.

Considering that reaction proceeds in an acidic atmosphere, it is preferable to use such a crucible, boat and the like, as is made of alumina, quartz, acid resistant brick, graphite or noble metal such as platinum, as a vessel filled by raw material metal compounds in the course of calcination steps.

A barium-containing composite metal oxide comprising at least one metal selected from the group consisting of magnesium, aluminum, europium, manganese, strontium, calcium, terbium, zinc and titanium, and barium can be obtained by the above production method. The barium-containing composite metal oxide is a compound comprising barium, at least one metal, and oxygen.

Examples of the barium-containing composite metal oxide include blue color emitting fluorescent substances represented by the composition formula (Ba, Eu, $M^A$)MgAl$_{10}$O$_{17}$ (wherein $M^A$ represents at least one element selected from the group consisting of calcium, strontium, zinc and europium), green color emitting fluorescent substances represented by the composition formula (Ba, $M^B$, $M^C$)Al$_{12}$O$_{19}$ (wherein $M^B$ is at least one element selected from the group consisting of manganese and terbium, and $M^C$ is at least one element selected from the group consisting of europium, calcium, strontium, manganese and terbium), and high dielectrics represented by the composition formula (Ba$_x$, Sr$_{1-x}$)TiO$_3$ (wherein x is $0<x\leq 1$).

To obtain the barium-containing composite metal oxide such as the above-described composition, compounds are mixed at such mixing ratio that each metal ratio satisfies the objective compositional ratio, and the resulting mixture is calcined.

According to the production method of the present invention, the barium-containing composite metal oxide containing less agglomerated particles and having narrow particle size distribution is formed.

Even if the oxide obtained by above-described method may contain agglomerated particles depending on raw materials used or production conditions, the proportion of the agglomerated particles is very small. In such a case, the barium-containing composite metal oxide having less agglomerated particles can easily be produced by subjecting the oxide obtained to a light degree of pulverization treatment such as ball mill treatment or jet mill treatment in a short period of time.

By-products or unreacted raw material metal oxide powder other than the barium-containing composite metal oxide of the present invention may remain depending on the production conditions. Even in such a case, the barium-containing composite metal oxide of the present invention can easily be refined by a post-treatment such as a simple washing.

If desired and necessary, re-calcination may be conducted to further improve the performance of the barium-containing composite metal oxide powder obtained.

The barium-containing composite metal oxide powder containing less agglomerated particles and having narrow particle size distribution can be obtained by the production method of the present invention. The finely particulate barium-containing composite metal oxide containing less agglomerated particles contains particles having a primary particle size of about 5 μm or less in an amount of about 80 mass % or more, and such a finely particulate oxide can preferably be used in a variety of uses as raw materials for metal oxide-based ceramics, raw materials for paste, used as functional materials of fluorescent substances, dielectrics or the like.

Further, the production method according to the present invention can provide the barium-containing composite metal oxide containing at least two kinds of metallic elements and having weak agglomerating force of primary particles with each other which is suitable as a raw material powder of oxide-based ceramics that are functional materials of fluorescent substances, dielectrics or the like, a raw material of paste or a raw material of sintered body, and thus is industrially useful.

EXAMPLES

The present invention is described in more detail with reference to the following examples, but the invention is not limited to those examples.

Example 1

Barium oxalate, europium oxalate, magnesium oxalate and aluminum hydroxide were weighed and mixed such that Ba:Eu:Mg:Al were 0.9:0.1:1:10 in molar ratio, and placed in a core tube. An argon gas containing 2 vol % of hydrogen obtained by passing through water with bubbling, and hydrogen chloride were supplied to the core tube at a flow rate of 40 ml/min and 10 ml/min, respectively, to adjust a calcination atmosphere, and calcination was conducted at 1250° C. for 2 hours. Temperature of water which was conducted bubbling was 30° C. Because saturated water vapor pressure at 30° C. was 0.042 atm, concentration of water vapor was 4.2 volt. As a result of phase identification of the powder obtained by an X-ray diffraction analysis, it was found that a blue color emitting fluorescent substance of Ba$_{0.9}$Eu$_{0.1}$Al$_{10}$O$_{17}$ was formed. Further, as a result of observation with a scanning electron microscope (SEM), it was found that agglomeration of primary particles with each other was weak. Furthermore, as a result of measurement of particle diameter of 30 primary particles, it was found that all of the 30 primary particles had a primary particle diameter in a range of 0.8 to 1.4 μm, and an average primary particle diameter of 1.1 μm.

The blue color emitting fluorescent substance obtained above was irradiated with ultraviolet ray using Excimer 146 nm lamp (a product of Ushio Electric Co) in a vacuum chamber of 6.7 Pa ($5\times 10^{-2}$ Torr) or less. As a result, it showed strong blue color emission. Further, when this blue color emitting fluorescent substance was excited with ultraviolet ray of 254 nm, ultraviolet ray of 365 nm, cathode ray and X-ray, all of the emissions were blue color emission of high brightness.

Comparative Example 1

Calcination was conducted in the same manner as in Example 1 except that hydrogen chloride and argon gas containing 2 volt % of hydrogen were supplied at a rate of 10 ml/min and 40 ml/min. respectively, to form a calcination atmosphere. With regard to the powder obtained, as a result of identification of phase by an X-ray diffraction analysis, it was found that the power was a mixed phase of Al$_2$O$_3$ and MgAl$_2$O$_4$, and a barium-containing composite metal oxide powder was not obtained.

What is claimed is:

1. A method for producing a barium-containing composite metal oxide, comprising calcining a mixture of a barium compound and a metal compound comprising at least one metal selected from the group consisting of magnesium, aluminum, europium, manganese, strontium, calcium, terbium, zinc and titanium, or calcining a barium-containing composite metal salt comprising barium and at least one metal selected from the group consisting of magnesium, aluminum, europium, manganese, strontium, calcium, terbium, zinc and titanium, in a gas comprising a hydrogen halide and water vapor; wherein said hydrogen halide is hydrogen chloride.

2. The method according to claim 1, wherein said gas further comprises hydrogen gas.

3. The method according to claim 1, wherein said gas has a water vapor concentration of about 0.5 vol % or higher.

4. The method according to claim 1, wherein said barium compound is barium oxide.

5. The method according to claim 1, wherein said metal compound is metal oxide.

6. The method according to claim 1, wherein said barium-containing composite metal oxide has a composition formula $(Ba, Eu, M^A)MgAl_{10}O_{17}$ wherein $M^A$ represents at least one metal selected from the group consisting of calcium, strontium, zinc and europium.

7. The method according to claim 1, wherein said barium-containing composite metal oxide has a composition formula $(Ba, M^B, M^C)Al_{12}O_{19}$ wherein $M^B$ is at least one metal of manganese and terbium, and $M^C$ is at least one element selected from the group consisting of europium, calcium, strontium, manganese and terbium.

8. The method according to claim 1, wherein said barium-containing composite metal oxide has a composition formula $(Ba_x, Sr_{1-x})TiO_3$ wherein x is $0 < x \leqq 1$.

* * * * *